United States Patent
Melanson et al.

(10) Patent No.: US 9,101,010 B2
(45) Date of Patent: Aug. 4, 2015

(54) HIGH-EFFICIENCY LIGHTING DEVICES HAVING DIMMER AND/OR LOAD CONDITION MEASUREMENT

(71) Applicant: Cirrus Logic, Inc., Austin, TX (US)

(72) Inventors: John L. Melanson, Austin, TX (US); Eric King, Dripping Springs, TX (US); Siddharth Maru, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 14/212,546

(22) Filed: Mar. 14, 2014

(65) Prior Publication Data

US 2014/0265893 A1    Sep. 18, 2014

Related U.S. Application Data

(60) Provisional application No. 61/798,493, filed on Mar. 15, 2013.

(51) Int. Cl.
*H02M 1/36* (2007.01)
*H05B 33/08* (2006.01)
*H05B 39/04* (2006.01)

(52) U.S. Cl.
CPC ........ *H05B 33/0806* (2013.01); *H05B 33/0845* (2013.01); *H05B 33/0848* (2013.01); *H05B 39/044* (2013.01); *Y02B 20/383* (2013.01)

(58) Field of Classification Search
CPC . H05B 33/0815; H05B 33/0851; H05B 37/02
USPC ......... 315/291, 360, 192, 193, 224, 226, 178, 315/307
See application file for complete search history.

(56) References Cited

U.S. PATENT DOCUMENTS

| | | |
|---|---|---|
| 4,523,128 A | 6/1985 | Stamm et al. |
| 5,055,746 A | 10/1991 | Hu et al. |
| 5,319,301 A | 6/1994 | Callahan et al. |
| 5,321,350 A | 6/1994 | Haas |

(Continued)

FOREIGN PATENT DOCUMENTS

| | | |
|---|---|---|
| EP | 1164819 | 12/2001 |
| EP | 2257124 A1 | 1/2010 |

(Continued)

OTHER PUBLICATIONS

U.S. Appl. No. 14/101,963, filed Dec. 10, 2013, Melanson, et al.

(Continued)

*Primary Examiner* — Douglas W Owens
*Assistant Examiner* — Raymond R Chai
(74) *Attorney, Agent, or Firm* — Mitch Harris, Atty at Law, LLC; Andrew M. Harris

(57) ABSTRACT

A circuit for powering high-efficiency lighting devices from a thyristor-controlled dimmer includes a power converter for powering the high-efficiency lighting devices from input terminals of the circuit. The circuit also includes a control circuit that controls the input current drawn by the input terminals at least while the power converter transfers energy to the lighting devices. The circuit also includes a sensing circuit that determines or measures at least one attach current characteristic at the input terminals and stores an indication of the characteristic for subsequent operation of the control circuit.

16 Claims, 7 Drawing Sheets

(56) References Cited

U.S. PATENT DOCUMENTS

| | | |
|---|---|---|
| 5,430,635 A | 7/1995 | Liu |
| 5,691,605 A | 11/1997 | Xia et al. |
| 5,770,928 A | 6/1998 | Chansky et al. |
| 6,043,635 A | 3/2000 | Downey |
| 6,046,550 A | 4/2000 | Ference et al. |
| 6,091,205 A | 7/2000 | Newman, Jr. et al. |
| 6,211,624 B1 | 4/2001 | Holzer |
| 6,380,692 B1 | 4/2002 | Newman, Jr. et al. |
| 6,407,514 B1 | 6/2002 | Glaser et al. |
| 6,621,256 B2 | 9/2003 | Muratov et al. |
| 6,713,974 B2 | 3/2004 | Patchornik et al. |
| 6,858,995 B2 | 2/2005 | Lee et al. |
| 6,900,599 B2 | 5/2005 | Ribarich |
| 7,102,902 B1 | 9/2006 | Brown et al. |
| 7,180,250 B1 | 2/2007 | Gannon |
| 7,184,937 B1 | 2/2007 | Su et al. |
| 7,288,902 B1 | 10/2007 | Melanson |
| 7,656,103 B2 | 2/2010 | Shteynberg et al. |
| 7,719,246 B2 | 5/2010 | Melanson |
| 7,733,678 B1 | 6/2010 | Notohamiprodjo et al. |
| 7,759,881 B1 | 7/2010 | Melanson |
| 7,786,711 B2 | 8/2010 | Wei et al. |
| 7,872,427 B2 | 1/2011 | Scianna |
| 8,102,167 B2 | 1/2012 | Irissou et al. |
| 8,115,419 B2 | 2/2012 | Given et al. |
| 8,169,154 B2 | 5/2012 | Thompson et al. |
| 8,212,491 B2 | 7/2012 | Kost et al. |
| 8,212,492 B2 | 7/2012 | Lam et al. |
| 8,222,832 B2 | 7/2012 | Zheng et al. |
| 8,569,972 B2 | 10/2013 | Melanson |
| 8,749,173 B1 | 6/2014 | Melanson et al. |
| 2004/0105283 A1 | 6/2004 | Schie et al. |
| 2004/0212321 A1 | 10/2004 | Lys et al. |
| 2006/0022648 A1 | 2/2006 | Ben-Yaakov et al. |
| 2006/0208669 A1 | 9/2006 | Huynh et al. |
| 2007/0182338 A1 | 8/2007 | Shteynberg et al. |
| 2007/0182347 A1 | 8/2007 | Shteynberg |
| 2008/0018261 A1 | 1/2008 | Kastner |
| 2008/0143266 A1 | 6/2008 | Langer |
| 2008/0192509 A1 | 8/2008 | Dhuyvetter et al. |
| 2008/0205103 A1 | 8/2008 | Sutardja et al. |
| 2008/0224629 A1 | 9/2008 | Melanson |
| 2008/0224633 A1 | 9/2008 | Melanson |
| 2008/0224636 A1 | 9/2008 | Melanson |
| 2009/0134817 A1 | 5/2009 | Jurngwirth et al. |
| 2009/0195186 A1 | 8/2009 | Guest et al. |
| 2009/0284182 A1 | 11/2009 | Cencur |
| 2010/0002480 A1 | 1/2010 | Huynh et al. |
| 2010/0013405 A1 | 1/2010 | Thompson et al. |
| 2010/0013409 A1 | 1/2010 | Quek et al. |
| 2010/0066328 A1 | 3/2010 | Shimizu et al. |
| 2010/0164406 A1 | 7/2010 | Kost et al. |
| 2010/0213859 A1 | 8/2010 | Shteynberg et al. |
| 2010/0231136 A1 | 9/2010 | Reisenauer et al. |
| 2010/0244726 A1 | 9/2010 | Melanson |
| 2011/0043133 A1 | 2/2011 | Van Laanen et al. |
| 2011/0080110 A1 | 4/2011 | Nuhfer et al. |
| 2011/0084622 A1 | 4/2011 | Barrow et al. |
| 2011/0084623 A1 | 4/2011 | Barrow |
| 2011/0115395 A1 | 5/2011 | Barrow et al. |
| 2011/0121754 A1 | 5/2011 | Shteynberg |
| 2011/0148318 A1 | 6/2011 | Shackle et al. |
| 2011/0204797 A1 | 8/2011 | Lin et al. |
| 2011/0204803 A1 | 8/2011 | Grotkowski et al. |
| 2011/0234115 A1 | 9/2011 | Shimizu et al. |
| 2011/0248647 A1* | 10/2011 | Hiramatu et al. ............ 315/294 |
| 2011/0266968 A1 | 11/2011 | Bordin et al. |
| 2011/0291583 A1 | 12/2011 | Shen |
| 2011/0309759 A1 | 12/2011 | Shteynberg et al. |
| 2012/0049752 A1 | 3/2012 | King et al. |
| 2012/0068626 A1 | 3/2012 | Lekatsas et al. |
| 2012/0112651 A1 | 5/2012 | King et al. |
| 2012/0286686 A1 | 11/2012 | Watanabe et al. |
| 2013/0002156 A1 | 1/2013 | Melanson et al. |
| 2013/0154495 A1 | 6/2013 | He |

FOREIGN PATENT DOCUMENTS

| | | |
|---|---|---|
| EP | 2232949 | 9/2010 |
| JP | 2008053181 A | 3/2008 |
| JP | 2009170240 A | 7/2009 |
| WO | WO 02/096162 A1 | 11/2002 |
| WO | WO 2006/079937 A1 | 8/2006 |
| WO | 2008029108 | 3/2008 |
| WO | 2010011971 A1 | 1/2010 |
| WO | WO 2010027493 A2 | 3/2010 |
| WO | WO 2010035155 A2 | 4/2010 |
| WO | WO 2011008635 A1 | 1/2011 |
| WO | WO 2011/050453 A1 | 5/2011 |
| WO | WO 2011/056068 A2 | 5/2011 |
| WO | WO 2012/016197 A1 | 2/2012 |

OTHER PUBLICATIONS

Adrian Z Amanci, et al. "Synchronization System with Zero-Crossing Peak Detection Algorithm for Power System Applications." 2010 IPEC Conference. Jun. 2010. pp. 2884-2991. Publisher: IEEE. Piscataway, NJ, USA.

Patterson, James. "Efficient Method for Interfacing Triac Dimmers and LEDs", EDN Network, Jun. 23, 2011, 4 pages (pp. 1-4 in pdf), National Semiconductor Corp., UBM Tech.

Vainio, et al., "Digital Filtering for Robust 50/60 Hz Zero-Crossing Detectors", IEEE Transactions on Instrumentation and Measurement, Apr. 1996, vol. 45, No. 2, Piscataway, NJ, US.

Azoteq, IQS17 Family, IQ Switch—ProxSense Series, Touch Sensor, Load Control and User Interface, IQS17 Datasheet V2.00.doc, Jan. 2007, pp. 1-51, Azoteq (Pty) Ltd., Paarl, Western Cape, Republic of South Africa.

Chan, Samuel, et al, Design and Implementation of Dimmable Electronic Ballast Based on Integrated Inductor, IEEE Transactions on Power Electronics, vol. 22, No. 1, Jan. 2007, pp. 291-300, Dept. of Electron. Eng., City Univ. of Hong Kong.

Rand, Dustin, et al, Issues, Models and Solutions for Triac Modulated Phase Dimming of LED Lamps, Power Electronics Specialists Conference, 2007. PESC 2007. IEEE, Jun. 17-21, 2007, pp. 1398-1404, Boston, MA, USA.

Gonthier, Laurent, et al, EN55015 Compliant 500W Dimmer with Low-Losses Symmetrical Switches, ST Microelectronics, Power Electronics and Applications, 2005 European Conference, pp. 1-9, Aug. 7, 2006, Dresden.

Green, Peter, A Ballast That Can Be Dimmed from a Domestic (Phase Cut) Dimmer, International Rectifier, IRPLCFL3 rev.b, pp. 1-12, Aug. 15, 2003, El Segundo, California, USA.

Hausman, Don, Real-Time Illumination Stability Systems for Trailing-Edge (Reverse Phase Control) Dimmers, Lutron RTISS, Lutron Electronics Co, Dec. 2004, pp. 1-4, Coopersburg, PA, USA.

Lee, Stephen, et al, A Novel Electrode Power Profiler for Dimmable Ballasts Using DC Link Voltage and Switching Frequency Controls, IEEE Transactions on Power Electronics, vol. 19, No. 3, May 2004, pp. 847-833, City University of Hong Kong.

Engdahl, Tomi, Light Dimmer Circuits, 1997-2000, 9 pages (pp. 1-9 in pdf), dowloaded from www.epanorama.net.

O'Rourke, Conan, et al, Dimming Electronic Ballasts, National Lighting Product Information Program, Specifier Reports, vol. 7, No. 3, Oct. 1999, pp. 1-24, Troy, NY, USA.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

Why Different Dimming Ranges?, 2003, 1 page, downloaded from http://www.lutron.com/TechnicalDocumentLibrary/LutronBallastpg3.pdf.

Wu, Tsai-Fu, et al, Single-Stage Electronic Ballast with Dimming Feature and Unity Power Factor, IEEE Transactions on Power Electronics, vol. 13, No. 3, May 1998, pp. 586-597.

\* cited by examiner

HIGH-EFFICIENCY LIGHTING DEVICES HAVING DIMMER AND/OR LOAD CONDITION MEASUREMENT

This patent application claims priority under 35 U.S.C. 119(e) to U.S. Provisional Patent Application Ser. No. 61/798,493 filed on Mar. 15, 2013

BACKGROUND OF THE INVENTION

1. Field of the Invention

The present invention relates generally to lighting device power sources such as those included within dimmable light emitting diode lamps, and in particular to a lighting device that detects and stores characteristics of a triac-based dimmer and subsequently powers high-efficiency lighting devices using the stored characteristics.

2. Background of the Invention

Lighting control and power supply integrated circuits (ICs) are in common use in both electronic systems and in replaceable consumer lighting devices, e.g., light-emitting-diode (LED) and compact fluorescent lamp (CFL) replacements for traditional incandescent light bulbs.

In particular, in dimmable high-efficiency replacement light bulbs, the low energy requirements of the lighting devices makes it difficult for the dimmers to operate properly, as the typical triac-controlled dimmer is designed for operation with a load that requires on the order of ten times the current required by the typical high-efficiency lighting device. Therefore, dimmable high-efficiency replacement lighting device circuits must ensure that the dimmer operates properly and efficiently in conjunction with the lighting devices, i.e., supplies a sufficient amount of energy and provides a needed indication of the dimming level, so that dimming of the lighting devices can be performed.

Therefore, it would be desirable to provide a dimmable high-efficiency lighting device power source circuit that provides proper and efficient operation of a triac-based dimmer circuit.

SUMMARY OF THE INVENTION

The invention is embodied in a circuit for supplying power to high efficiency lighting devices from a thyristor-controlled dimmer circuit, an integrated circuit (IC) including such a circuit and a method of operation of the circuit.

The circuit includes input terminals for connection to the output of the thyristor-controlled dimmer and a power converter for powering the high efficiency lighting devices from the input terminals. The circuit also includes an input current control circuit that controls the input current drawn by the input terminals at least during an active time period for which the power converter transfers energy. The circuit also includes a sensing circuit that determines or measures at least one attach current characteristic at the input terminals and stores an indication of the characteristic for subsequent operation of the input current control circuit.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present disclosure reveals circuits and methods for powering and controlling lighting devices. In particular embodiments, strings of light-emitting diodes (LEDs) are packaged to replace incandescent lamps, and the energy supplied to the LED strings is varied in accordance with a dimming value determined from operation of a thyristor-controlled dimmer supplying the replacement lighting device, so that dimmed operation is achieved. The devices disclosed herein obtain and store information about load conditions at the output of the thyristor-controlled dimmer and control operation of the devices in accordance with the stored information. The information, which is an attach current characteristic forming part of an attach current profile, may include one or more of a starting value of the input current, a peak value of the input current, a steady-state hold value of the input current, a glue current or glue impedance value, a damping current or damping impedance value, a damping time period, an active time period, or a time during a cycle at which the input current becomes equal to one of the above current values or another predetermined current value. The times may be referenced to the leading edge of the dimmer waveform.

Figure 1:
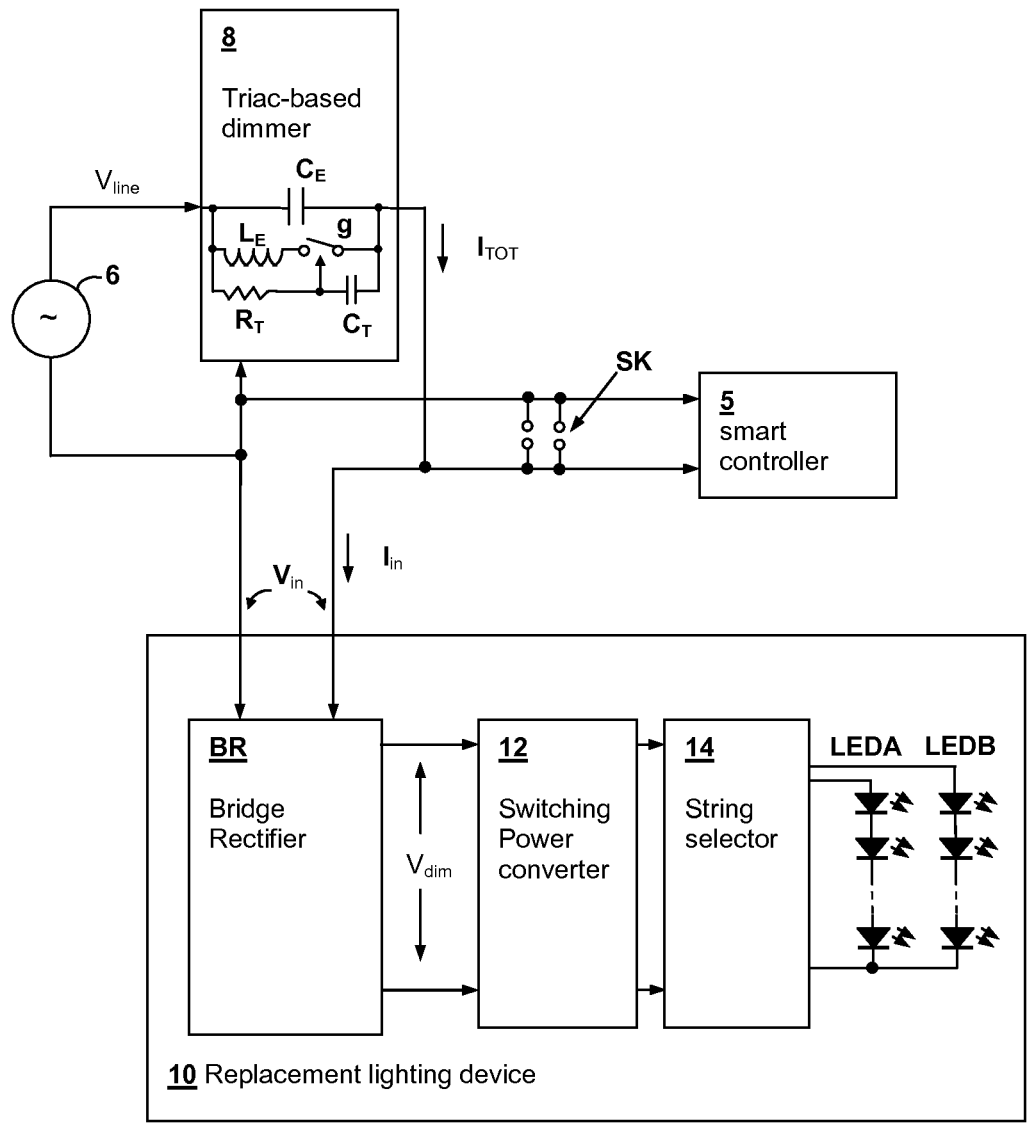
FIG. 1 is a block diagram depicting an exemplary lighting circuit.

Referring now to FIG. 1, an exemplary lighting circuit is shown. An alternating current (AC) power line source 6 provides an AC line voltage $V_{line}$ to a replacement lighting device 10 through a triac-based dimmer 8 that is, for example, designed for operation with incandescent bulbs having a power consumption of 40 W or greater. Replacement lighting device 10 uses LEDs LEDA, LEDB, to supply light, which may be strings of LEDs connected in series, as shown. LEDs LEDA, LEDB receive their operating currents from a string selector 14 that, in turn, receives the output of a switching power converter 12 that transfers energy from a capacitor that is charged from a bridge rectifier BR coupled to the input terminals of replacement lighting device 10, which are connected to the output terminals of triac-based dimmer 8. A smart controller 5 is also connected to the output terminals of triac-based dimmer 8 and may communicate with circuits in replacement lighting device 10 as described in further detail below.

Within the block depicting triac-based dimmer 8, a model equivalent circuit is shown that is useful for describing the operation of the triac and timing circuits within an actual triac-based dimmer. A switch g illustrates operation of the triac itself, which alternately conducts current $I_{in}$ between AC power line source 6 and replacement lighting device 10. Initially, when switch g is open, an EMI capacitor $C_E$ and the timing circuit formed by a timing resistor $R_T$ and a timing capacitor $C_T$ charge through the load applied at the output terminal of triac-based dimmer 8, which in ordinary operation is typically an incandescent bulb of 40 W or greater power consumption. Once capacitor $C_T$ is charged to a threshold voltage magnitude, switch g closes (i.e., the gate of the triac is triggered) and AC line voltage $V_{line}$ is provided to the output of triac-based dimmer through an inductor $L_E$, which is provided for EMI filtering and to reduce lamp buzz (acoustic noise in an incandescent filament). Once switch g is closed, switch g remains closed (i.e., the triac continues to conduct) until the magnitude of current $I_{in}$ conducted through triac-based dimmer 8 falls below the hold current of the triac. However, if an insufficiently low-impedance load is connected to the output of the triac, the stored energy from capacitor $C_E$, which has been dumped into inductor $L_E$, will return to capacitor $C_E$ as the parallel combination of capacitor $C_E$ and inductor $L_E$ begins to oscillate. When the current through inductor $L_E$ falls below the hold current of the triac, the triac will turn off.

Since a 100 W equivalent high-efficiency replacement bulb using LEDs typically consumes only 13 W of power, the input current requirements of an LED replacement lamp will generally be less than ⅓ of that conducted through the minimum specified wattage incandescent bulb. As LED efficiency continues to improve, the input current may decrease to values low as ⅒th the current that would be required by the minimum specified wattage incandescent bulb. Therefore, the triac in triac-based dimmer 8 can prematurely open due to the reduced current conducted through the triac, unless one or more other lighting devices are installed, for example, in sockets SK connected to the outputs of triac-based dimmer 8, or unless replacement lighting device 10 is designed to draw sufficient current to cause triac-based dimmer 8 to operate properly. Also, the timing circuit that triggers the triac in triac-based dimmer 8 can turn on the triac at the wrong time unless the proper conditions are present at the output of triac-based dimmer 8 from the time of the zero-crossing of AC line voltage $V_{line}$ until the triac in triac-based dimmer 8 is triggered. If switching power converter 12, in combination with any other devices connected to the output of triac-based dimmer 8, does not draw sufficient current from the output of triac-based dimmer 8 during the entire active period while energy is being transferred, the triac in triac-based dimmer 8 will turn off and the timing circuit will also be disrupted. Further, if the operation of replacement lighting device 10, which contains a switching power converter 12, is not somehow coordinated with the cut sine wave of rectified dimmer output voltage $V_{dim}$, then switching power converter 12 may not receive all of the energy needed to supply LEDs LEDA, LEDB for the cycle. Switching power converter 12 may also improperly re-trigger triac-based dimmer 8 if a low impedance is suddenly introduced at the output of triac-based dimmer 8 by starting another active cycle of switching power converter 12 after triac-based dimmer 8 has turned off for the current cycle.

In order to maintain proper operation of various phases of operation of replacement lighting device 10 that meet each of the above criteria for proper operation of triac-based dimmer 8 for all possible brightness settings, it is generally necessary under some conditions to dissipate some energy supplied by triac-based dimmer 8, rather than transferring all of the energy to LEDs LEDA, LEDB. The amount of current that must be drawn from the output of triac-based dimmer 8 for proper operation is dependent not only on the characteristics of triac-based dimmer 8 itself and the amount of energy needed to supply LEDs LEDA, LEDB, but also the number and energy consumption of other devices connected to the same circuit. In order to provide the most efficient operation, it is desirable to control the current drawn by replacement lighting device 8 to minimize the energy supplied by triac-based dimmer 8 that is purposefully dissipated as heat. Therefore, in the instant disclosure, various techniques for determining and applying an attach current profile are implemented in switching power converter 12. The attach current profile may be a current waveshape that switching power converter 12 follows, or may be defined by one or more discrete values of input current $I_{IN}$ and/or times during a cycle that input current $I_{IN}$ assumes a particular value.

Figure 2:
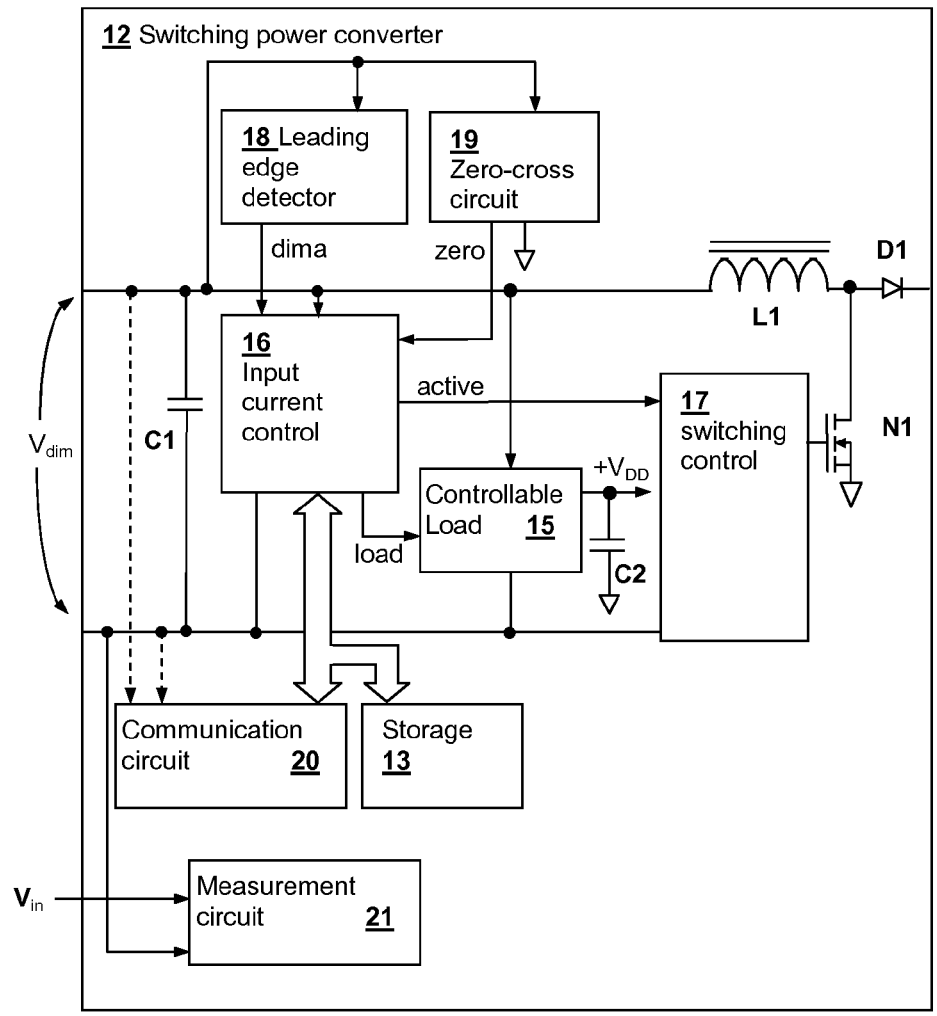
FIG. 2 is a block diagram depicting details of switching power converter circuit 12 of FIG. 1.

Referring now to FIG. 2, details of switching power converter 12 are shown. In order to prevent the above-described mis-triggering and/or early termination of an active cycle, triac-based dimmer 8, replacement lighting device 10 includes an input current control circuit 16 that, upon detection of a rise in a rectified dimmer output voltage $V_{dim}$ caused by a turn-on event of triac-based dimmer 8, applies an attach current profile for the cycle. Input current control circuit 16 controls both a switching control circuit 17 that controls the transfer of energy from an input capacitor C1 to LEDs LEDA, LEDB according to a control signal active, and also a controllable load 15 according to a control signal load, when current must be drawn from the output of triac-based dimmer 8 but energy is not used for illuminating to LEDs LEDA, LEDB. Controllable load 15 can be used to generate a power supply voltage $+V_{DD}$ for operating circuits within switching power converter and a filter capacitor C2 can be provided for filtering the output of controllable load 15 to provide a stable DC voltage. A transistor N1, a diode D1 and an inductor L1 provide a boost switched-power converter stage that supplies energy to string selector circuit 14, which may include another switched-power stage. The output of switching power converter 12 may be a boost converter in a non-isolated configuration as shown, a flyback, buck or buck-boost converter state in a non-isolated configuration, or may be an isolated or non-isolated transformer-coupled output stage. The attach current profile may be entirely, or in part, determined by values stored in a storage circuit 13 that provide indications of one or more attach current characteristics that are used to control the current drawn by replacement lighting device 10 from the output terminals of triac-based dimmer 8 in the given half-cycle of AC line voltage $V_{line}$. Storage 13 may be a non-volatile storage so that the circuit configuration, once received or determined, may be retained until the configuration changes. The attach current values may be determined from a measurement circuit 21 that observes the value of dimmer output voltage $V_{in}$ (or alternatively rectified dimmer output voltage $V_{dim}$) as the amount of current drawn by switching power converter is varied during the various phases of operation. Alternatively or in combination, information may be received from smart controller 5 or other lighting devices via signaling over the power line circuit that connects replacement lighting device 10 to triac-based dimmer 8. The communication may be, for example, by rapid pulsing of the line voltage, or via a signal imposed on the power lines such as the signaling employed by X10 protocols. As another alternative, wireless communications, such as optical, infrared or radio-frequency may be employed to communicate with replacement lighting device 10 independent of the electrical connections of replacement lighting device 10. For example, smart controller 5 may communicate the number and type of lighting devices connected to the output of triac-based dimmer 8 to a communication circuit 20 within switching power converter 12, which then determines a suitable attach current profile and stores information indicating the attach current profile in storage 13. The attach current profile might, for example, be selected from multiple predetermined attach current profiles corresponding to a number and type of lighting devices connected to the output of triac-based dimmer 8, and/or the attach current profile might vary between alternating half-cycles due to differences in the current requirements for each polarity of AC line voltage $V_{line}$.

Figure 3:
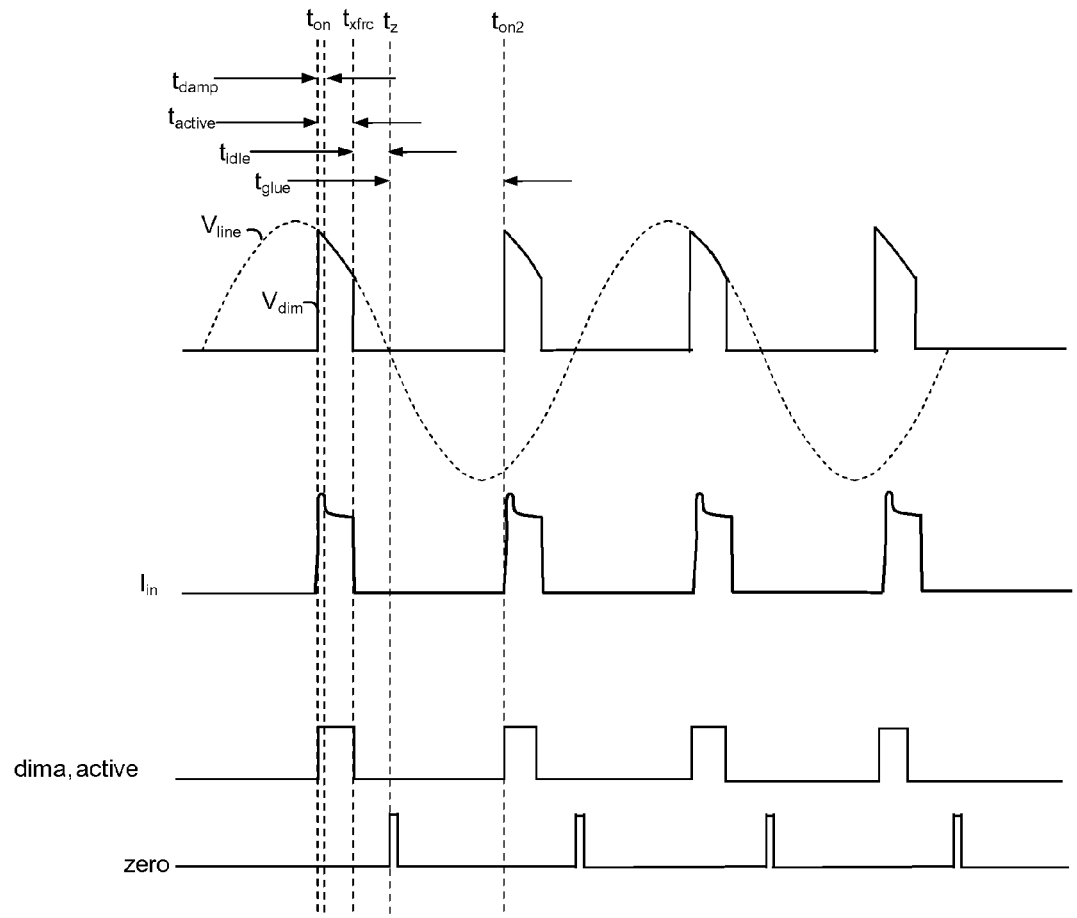
FIG. 3 is a signal waveform diagram illustrating various phases of operation of lighting circuits described herein.

Input current control circuit 16 performs management of the current drawn from the output terminals of triac-based dimmer 8 by replacement lighting device 10 according to the various phases of operation, as will be described with additional reference to FIG. 3. When the leading edge of dimmer output voltage $V_{dim}$ is detected by a leading edge detector 18, a control signal dima is asserted, causing input current control circuit 16 to present a damping impedance level that is sufficient to prevent the re-triggering of the triac in triac-based dimmer 8 by damping the resonant circuit formed by capacitor $C_E$ and inductor $L_E$. The impedance at the input of replacement lighting device 10 is generally maintained at or below the requisite damping impedance level until a predetermined time period has passed. The requisite damping impedance level varies with the particular triac design and with the external loading conditions due to other lamps connected to the circuit, but is generally between 100 ohms and 1 kOhm, corresponding to an input current between approximately 120 mA and 1.2 A if no other device is connected, if for example, dimmer output voltage $V_{dim}$ is 120V when triac 8 turns on. If, for example, another device identical to replacement lighting device 10 is connected to the output of triac-based dimmer 8, the required damping impedance might be in the range of 200 Ohms to 2 k Ohms for each device, and if an incandescent lamp were connected to the output of triac-based dimmer 8, no damping impedance and thus no minimum input current is needed. The required initial (starting) current level, the peak current level, or a direct indication of the minimum impedance imposed during damping may form part of the attach current profile stored in storage, and may be determined by information received by communication circuit 20 and/or by measurements made by measurement circuit 21. At least a portion of the damping impedance can be provided by operation of switching power converter 12 which operates during a time period $t_{active}$ beginning just after a time $t_{on}$. In the depicted embodiment, control signal active, which is provided to switching power converter 12 to indicate to switching power converter 12 both when to start an energy transfer cycle, and how long the cycle may potentially extend, i.e., the maximum duration of the active cycle is the duration of the high-state pulse of control signal active. After a predetermined time period $t_{damp}$ has passed, replacement lighting device 10, along with any other connected devices, only needs to draw enough current to maintain the triac-based dimmer in a conducting state while energy needed to supply LEDs LEDA, LEDB for the cycle is being transferred. The predetermined time period may also be part of the attach current profile, as time period $t_{damp}$ may be determined, for example, by measuring and optimizing ringing on voltage waveform of dimmer output voltage $V_{dim}$ as the damping impedance level is decreased.

After active time period $t_{active}$ time period has expired, which is when the energy transfer needed to supply LEDs LEDA, LEDB for the cycle is complete at a time $t_{xfrc}$, replacement lighting device 10 enters a high impedance state for idle time period $t_{idle}$. During idle time period $t_{idle}$, input current control circuit 16 disables controllable load 15 and disables switching power converter 12 so that a sudden change in input current due to activation of switching power converter 12 does not trigger triac-based dimmer 8. Otherwise triac-based dimmer 8 might re-trigger capacitor $C_T$ being re-charged to the trigger threshold during a remaining portion of the half-cycle of AC line voltage $V_{line}$ for which the corresponding triac output cycle already been terminated. At time $t_z$, when the zero-crossing of AC line voltage $V_{line}$ is predicted or detected, a "glue" impedance required for proper timer operation as described above is applied across the input terminals of replacement lighting device 10 for a time period $t_{glue}$. Then, the damping impedance is applied for a predetermined period $t_{damp}$, commencing when the triac in triac-based dimmer 8 turns on. Finally, a current equal to or greater than the minimum hold current is drawn during the active time period. The hold current is the minimum current required to maintain the conducting state of the triac in triac-based dimmer 8, which is generally between 25 and 70 milliamperes. However, as noted above for the damping impedance, if another replacement lighting device is connected to the output terminals of triac-based dimmer 8, the required hold current would be reduced proportionately and if an incandescent bulb were connected, the hold current requirement could be ignored. The hold current value also may form part of the attach current profile(s) stored in storage 13.

In order to maintain the triac in triac-based dimmer 8 in a conducting state, for the total duration of the active time period $t_{active}$, input current control circuit 16 ensures that the minimum hold current is drawn from the output terminals of triac-based dimmer 8 by the parallel combination of all of the devices connected to the output of triac-based dimmer 8. After active time period $t_{active}$ is complete, input current control circuit 16 disables all sources of current drain through the input terminals of replacement lighting device 10. When the next zero-crossing of AC line voltage $V_{line}$ occurs at time $t_z$, in order to ensure that the next leading edge of the output of triac-based dimmer 8 occurs at the correct time, proper operation of the timer circuit formed by capacitor $C_T$ and resistor $R_T$ must be provided. As mentioned above, at time $t_z$ the next zero-crossing of AC line voltage $V_{line}$ occurs, and from time $t_z$ until triac-based dimmer 8 turns on again at a time $t_{on2}$, path for the input current $I_{in}$ that is charging timing capacitor $C_T$ must be provided at the input of replacement lighting device, which is provided by supplying an impedance less than or equal to a maximum glue impedance across the output terminals of triac-based dimmer 8. The glue impedance must be low enough not to generate a voltage drop across the inputs of replacement lighting device 10 that would substantially affect the trigger point of the triac, e.g., the time at which switch g closes. In order to prevent the above-described mis-operation of triac-based dimmer 8, replacement lighting device 10 includes a zero-cross circuit 19 that predicts or detects a zero-cross time of AC line voltage $V_{line}$ by observing dimmer output voltage $V_{dim}$. Zero-cross circuit 19 provides a control signal zero that signals input current control circuit 16 to ensure that a sufficiently low glue impedance is presented at the input terminals of replacement lighting device 10 from the zero-cross time until the turn-on event is detected by leading edge detection circuit 18. The glue impedance needed to ensure proper timing is generally an impedance substantially equal to 100 ohms or less, which also may form part of an attach current profile stored in storage 13 and which, as with the other impedances mentioned above, can be increased for replacement lighting device 10 when other devices are connected to the output of triac-based dimmer 8. For example, a 100 W incandescent bulb has an impedance of approximately 87 Ohms and so no additional glue impedance would need to be supplied by replacement lighting device 10 if such a bulb were connected to the output of triac-based dimmer 8.

Figure 4:
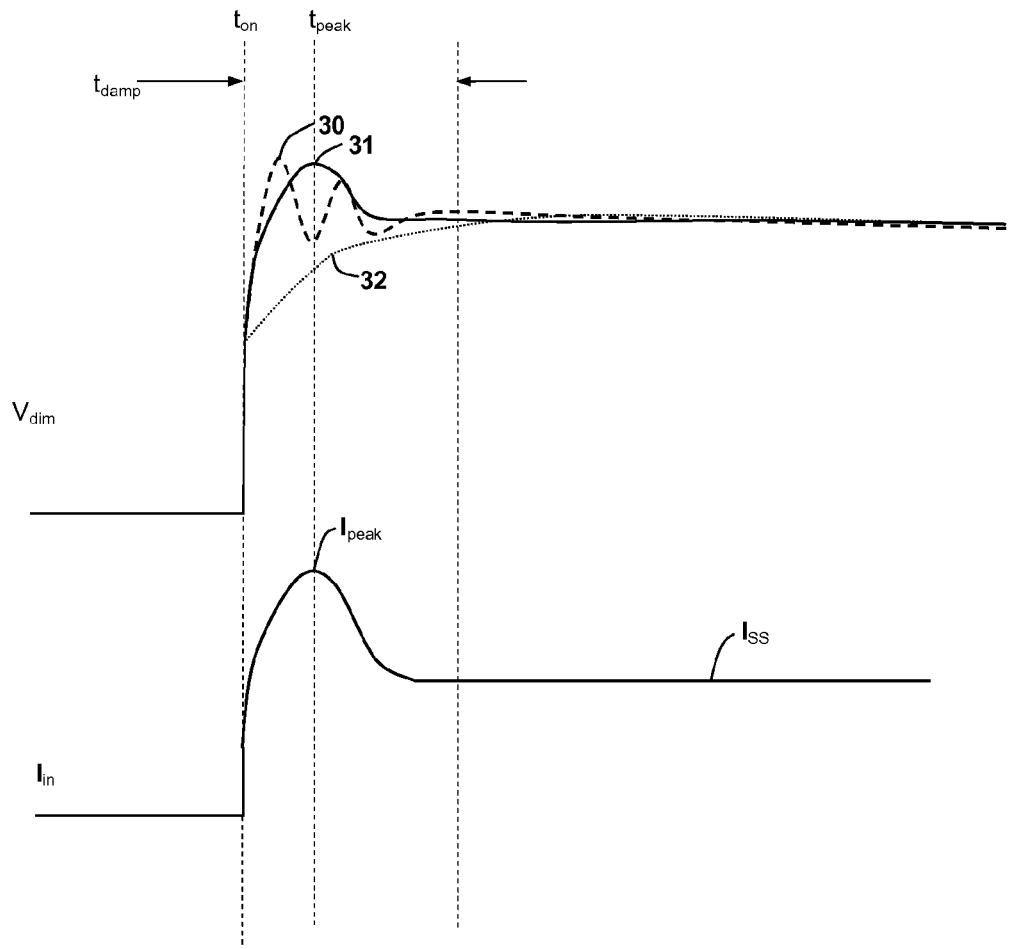
FIG. 4 is a signal waveform diagram illustrating details of the damping phase of the diagram of FIG. 3 for different damping impedances of different attach current profiles.

Referring now to FIG. 4, examples of optimizing the attach current profile to provide a sufficiently low damping impedance is illustrated. The output voltage $V_{dim}$ of triac-based dimmer 8 will exhibit ringing when the damping current level is too low as illustrated by waveform 30, which can be detected by voltage measurement circuit 21. If the damping current level is unnecessarily high, then the leading edge of the output voltage $V_{dim}$ may take on the waveshape illustrated by waveform 32. Waveform 31 illustrates a desirable critically-damped condition. Dimmer output voltage $V_{dim}$ may be measured and the impedance level presented by replacement lighting device 10 during time period $t_{damp}$ adjusted iteratively over several cycles in order to obtain the waveshape illustrated in waveform 31. Then the value of the damping current or impedance may be stored in storage 13 and used for subsequent operation of input current control circuit 16. Other values that may be measured and stored are a peak value $I_{peak}$ of an input current $I_{in}$ and a subsequent steady state value $I_{ss}$ of input current $I_{in}$.

Figure 5:
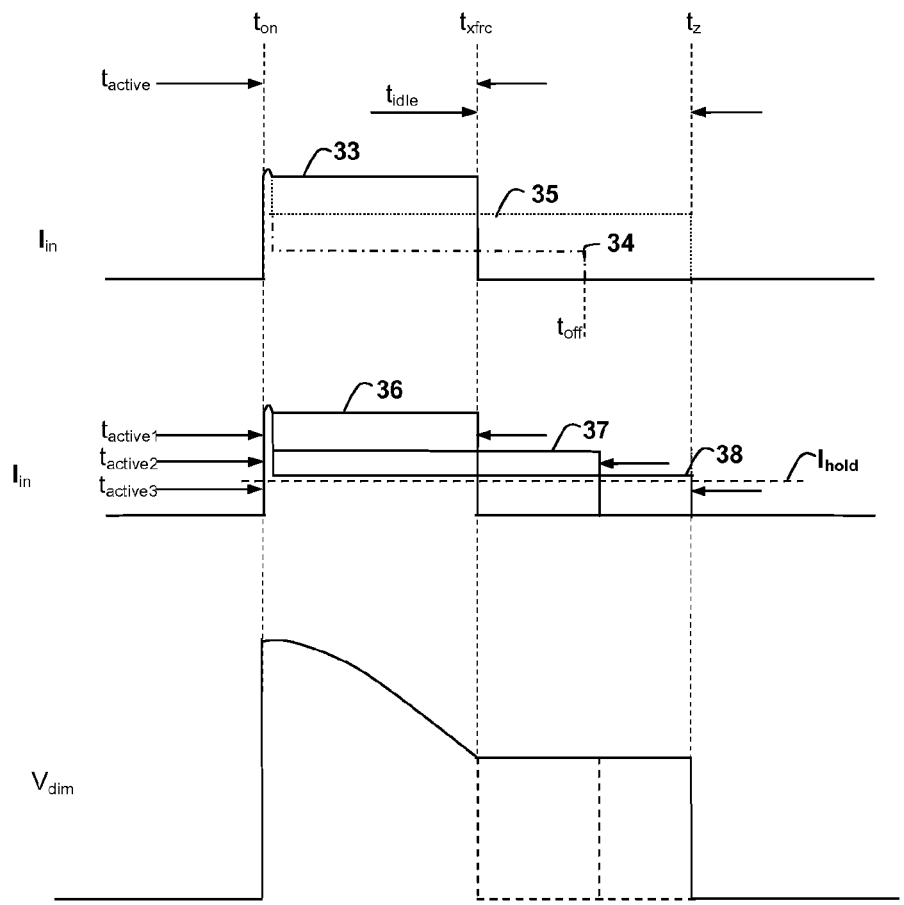
FIG. 5 is a signal waveform diagram illustrating details of the active and hold phases of the diagram of FIG. 3 for different attach current profiles.

Referring now to FIG. 5, examples of optimizing an attach current profile to provide the proper hold current for input current $I_{in}$ during time period $t_{active}$ and $t_{idle}$ are shown. A waveform 33 shows a level of active current that may be higher than necessary, which would result in dissipating energy via controllable load 15 during the idle period between times $t_{xfrc}$ and $t_z$. Also, the terminating step in input current $I_{in}$ that occurs at the end of active time period $t_{active}$ will result in a transient on the output terminals of triac-based dimmer 8 that can cause an undershoot in the total current supplied from triac-based dimmer 8 that falls below the minimum hold current, causing the triac in triac-based dimmer 8 to turn off. Therefore, it is desirable to extend the active time period $t_{active}$ to the maximum duration that does not cause input current $I_{in}$ to fall below the minimum hold current, while avoiding dissipation of excess energy in controllable load 15. An optimized attach current profile is shown in a waveform 35, in which input current $I_{in}$ is constant, which may all be due to transfer by switching power converter 12 or by matching the value of controllable load 15 to the impedance presented by switching power converter 12 during transfer to provide a minimum hold current level. Another waveform 34 illustrates a condition under which it was not possible to reduce the hold current to the level illustrated by waveform 33, because the hold current does not meet the minimum requirements of triac-based dimmer 8 and the triac in triac-based dimmer 8 has turned off at time $t_{off}$. Another set of waveforms 36-38 for input current $I_{in}$ is shown, in which current $I_{in}$ is progressively optimized to reduce a constant level of input current $I_{in}$ during time period $t_{active}$ by increasing time period $t_{active}$. In general, time period $t_{active}$ should be made as long as possible while maintaining input current $I_{in} > I_{hold}$ and time $t_{xfrc} <$ zero-crossing time $t_z$. Waveform 36 of input current $I_{in}$ has an active time period $t_{active1}$ that is too short and can cause the above-mentioned transient, as does waveform 37 of input current $I_{in}$, which has a longer active time period $t_{active2}$, but that can still cause the transient behavior. Waveform 38 has an active time period $t_{active3}$, that extends to the next zero-crossing time $t_z$ while maintaining a current level of input current $I_{in}$ that is greater than minimum hold current $I_{hold}$ and does not exhibit the transient behavior.

Figure 6:
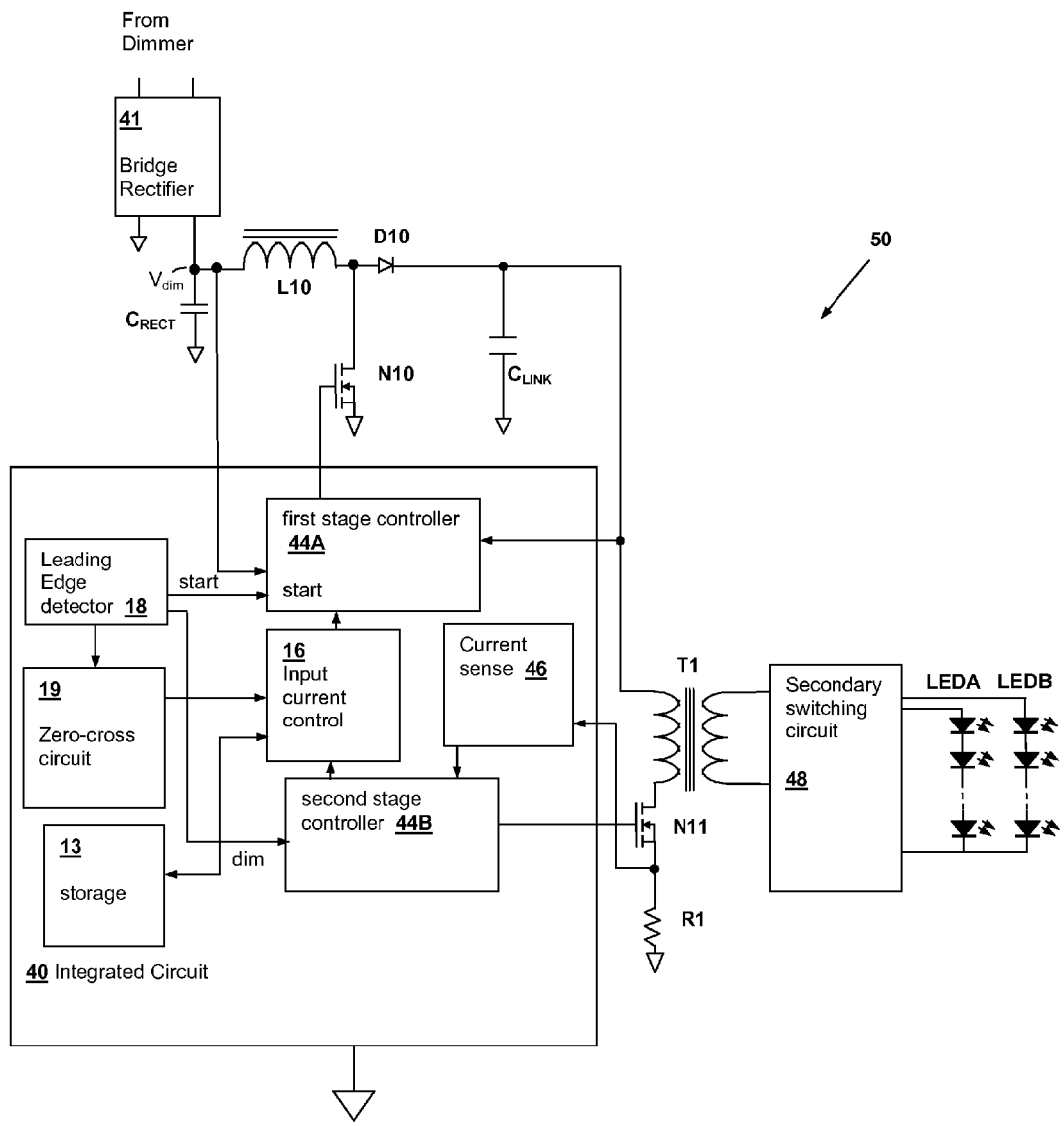
FIG. 6 is a simplified schematic diagram of another exemplary lighting circuit.

Referring now to FIG. 6, another exemplary lighting circuit 50 is shown. The output of a dimmer is provided to a bridge rectifier 41 that generates a rectified dimmer output voltage $V_{dim}$. A capacitor $C_{RECT}$ provides filtering of higher frequency switching components generated by a boost input stage implemented by an inductor L10, a switching transistor N10, a diode D10 and a capacitor $C_{LINK}$. A resistor R1 provides for current-sensing of the primary current provided through transistor N10. An integrated circuit 40 provides control of transistor N10 from a first stage controller 44A and further controls a flyback converter stage from a second stage controller 44B that switches a transistor N11 to provide current through a transformer T1 in response to feedback provided from a current sensing circuit 46. A second stage controller 44B provides information about energy requirements to input current control circuit 16, which provides control indication to first stage controller 44A to dynamically control the input current drawn from the output of bridge rectifier 41, thereby controlling the impedance presented to the output of triac-controller dimmer 8. Zero-cross predictor 19 and leading edge detector 18 operate as described above for the circuit of FIGS. 1-2. Current for operating LEDs LEDA, LEDB may be supplied through a secondary switching circuit 48 that alternates application of the secondary current between LED strings, which may be of different color in order to provide a color profile that varies with the dimming value dim or under other control input. First stage controller 44A is activated by control signal zero as described above with reference to FIGS. 1-2.

Figure 7:
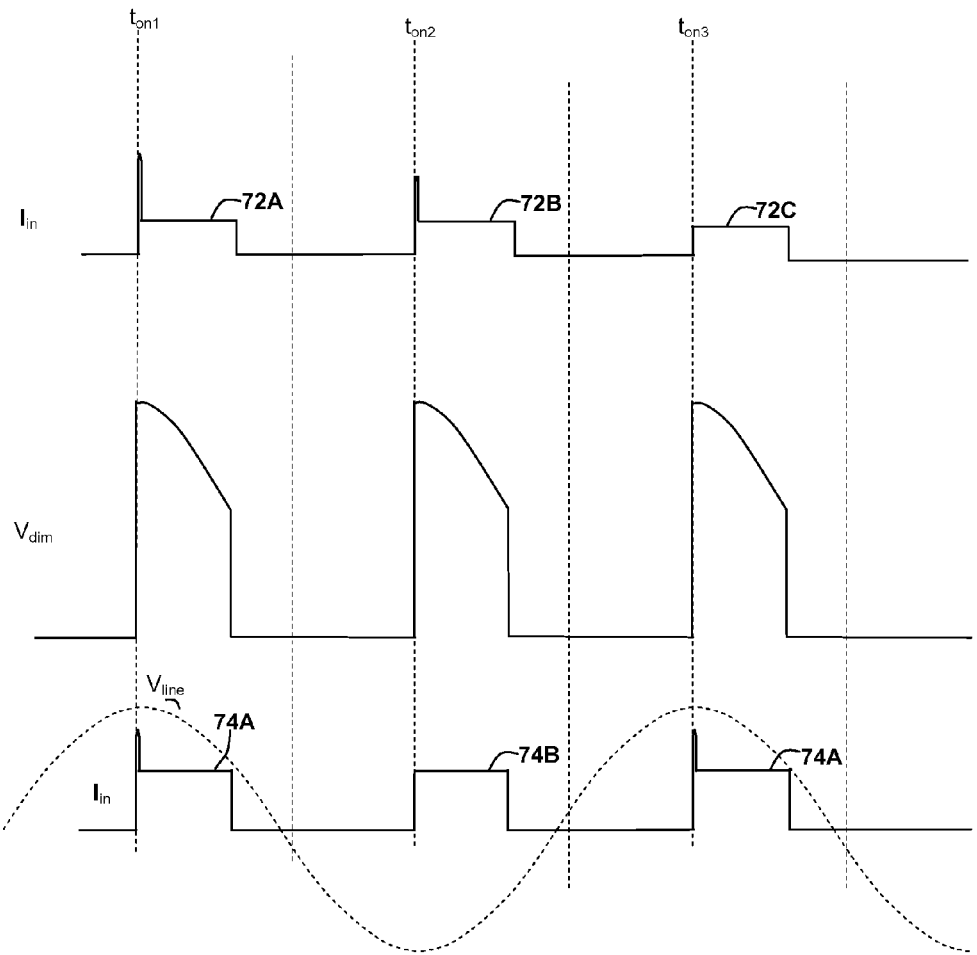
FIG. 7 is a signal waveform diagram illustrating application of different attach current profiles that may be applied in the circuits of FIGS. 1-2 and FIG. 6.

Referring now to FIG. 7, application of selectable attached current profiles is shown. As mentioned above, storage 13 may store multiple attach current profiles, from which selections may be made according to operating conditions. As illustrated in waveforms 72A, 72B and 72C, the input current $I_{in}$, during the damping phase should be higher for conditions in which no other device is connected to the output of triac-based dimmer 8, which is illustrated by waveform 72A. If, for example, one other identical replacement lighting device 10 were connected to the output of triac-based dimmer 8, only half of the damping current level would be required from each device, as illustrated by waveform 72B, and if an incandescent bulb or other high-current load is connected to the output of triac-based dimmer 8, no damping current would be required, as illustrated by waveform 72C. The bottom waveform illustrates a condition under which damping is determined to be needed only during positive half-cycles of AC line voltage $V_{line}$, which could be due to the design of the dimmer or due to an asymmetrical load connected to the output of triac-based dimmer. A different attach current profile is selected for positive half-cycles of AC line voltage $V_{line}$ than for negative half-cycles, resulting in a different damping current in a waveform 74A of input current $I_{in}$ than in a waveform 74B of input current $I_{in}$.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A lighting circuit for powering one or more lighting devices from an output of a thyristor-switched dimmer circuit, comprising:

input terminals for coupling the lighting circuit to the output of the thyristor-switched dimmer circuit, wherein the thyristor-switched dimmer circuit supplies an input voltage and an input current to the lighting circuit at the input terminals;

a power converter having an input coupled to the input terminals and at least one output for supplying energy to the one or more lighting devices, wherein the power converter transfers energy from the input terminals to the at least one output during an active time period;

an input current control circuit for controlling the input current at least during the active time period;

a sensing circuit for sensing the input voltage and determining a first attach current characteristic for positive half cycles of an AC line voltage supplied to the input of the thyristor-switched dimmer circuit and a second attach current characteristic for negative half cycles of the AC line voltage indicative of a load at the input terminals including external loads coupled to the output of the thyristor-switched dimmer circuit; and a storage circuit for storing information indicative of the first and second attach current characteristics, and wherein the input current control circuit alternatively selects between the first and second attach current characteristics at the alternating half cycles of the AC line voltage and controls the input current in conformity with the selected attach current characteristic.

2. The lighting circuit of claim 1, wherein the first and second attach current characteristics comprise one or more of a starting value of the input current, a peak value of the input current, a steady-state hold value of the input current or at least one timing value indicating a time at which the input current was equal to a predetermined value.

3. The lighting circuit of claim 2, wherein the first and second attach current characteristics comprise the at least one timing value, and wherein the at least one timing value is relative to a time of a leading edge of the input voltage.

4. The lighting circuit of claim 3, wherein the at least one timing value includes a value at which the input current is equal to the starting value of the input current, the peak value of the input current or the steady-state hold value of the input current.

5. The lighting circuit of claim 1, wherein the sensing circuit iteratively adjusts the first and second attach current characteristics in conformity with subsequent measurements of the input voltage.

6. The lighting circuit of claim 1, wherein the sensing circuit determines, from the input voltage, whether or not other lighting devices are connected to the output of the thyristor-switched dimmer circuit, and wherein the sensing circuit further selects from among differing attach current characteristics for each of the first and second attached current characteristics in conformity with whether or not other lighting devices are connected to the output of the thyristor-switched dimmer circuit.

7. The lighting circuit of claim 1, wherein the one or more lighting devices are light-emitting diode (LED) devices.

8. A method of powering one or more lighting devices from an output of a thyristor-switched dimmer circuit, comprising:
receiving the output of the thyristor-switched dimmer circuit at input terminals;
supplying energy to the one or more lighting devices by converting energy drawn from the input terminals during an active time period;
controlling an input current drawn by the receiving from the input terminals at least during the active time period;
sensing an input voltage across the input terminals and determining a first attach current characteristic for positive half cycles of an AC line voltage supplied to the input of the thyristor-switched dimmer circuit and a second attach current characteristic for negative half cycles of the AC line voltage indicative of a load across the input terminals including external loads coupled to the output of the thyristor-switched dimmer circuit; and
storing information indicative of the first and second attach current characteristics, and wherein the controlling alternatively selects between the first and second attach current characteristics at the alternating half cycles of the AC line voltage and controls the input current in conformity with the selected attach current characteristic.

9. The method of claim 8, wherein the first and second attach current characteristics comprise one or more of a starting value of the input current, a peak value of the input current, a steady-state hold value of the input current or at least one timing value indicating a time at which the input current was equal to a predetermined value.

10. The method of claim 9, wherein the first and second attach current characteristics comprise the at least one timing value, and wherein the at least one timing value is relative to a time of a leading edge of the input voltage.

11. The method of claim 10, wherein the at least one timing value includes a value at which the input current is equal to the starting value of the input current, the peak value of the input current or the steady-state hold value of the input current.

12. The method of claim 8, wherein the sensing comprises iteratively adjusting the first and second current characteristics in conformity with subsequent measurements of the input voltage.

13. The method of claim 8, wherein the sensing determines, from the input voltage, whether or not other lighting devices are connected to the output of the thyristor-switched dimmer circuit, and wherein the sensing further selects from among differing attach current characteristics for each of the first and second attached current characteristics in conformity with whether or not other lighting devices are connected to the output of the thyristor-switched dimmer circuit.

14. The method of claim 8, wherein the one or more lighting devices are light-emitting diode (LED) devices.

15. An integrated circuit for operating a circuit that powers one or more lighting devices from an output of a thyristor-switched dimmer circuit, comprising:
a power converter control circuit having an output for controlling a power converter for supplying current to the one or more lighting devices from the output of the thyristor-switched dimmer circuit, wherein the power converter transfers energy during an active time period;
an input current control circuit for controlling the input current at least during the active time period;
a sensing circuit for sensing the input voltage and determining a first attach current characteristic for positive half cycles of an AC line voltage supplied to the input of the thyristor-switched dimmer circuit and a second attach current characteristic for negative half cycles of the AC line voltage indicative of a load at the input terminals including external loads coupled to the output of the thyristor-switched dimmer circuit; and
a storage circuit for storing information indicative of the first and second attach current characteristics, and wherein the input current control circuit alternatively selects between the first and second attach current characteristics at the alternating half cycles of the AC line voltage and controls the input current in conformity with the selected attach current characteristic.

16. The integrated circuit of claim 15, wherein the first and second attach current characteristics comprise one or more of a starting value of the input current, a peak value of the input current, a steady-state hold value of the input current or at least one timing value indicating a time at which the input current was equal to a predetermined value.

* * * * *